May 1, 1928.
E. JENKINS
1,668,208
WHEEL ALIGNING DEVICE
Filed March 30, 1927
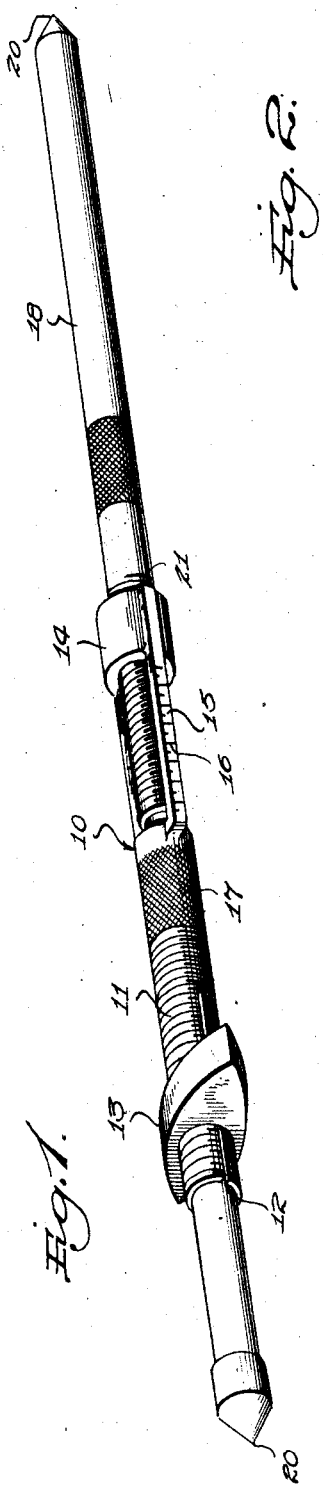
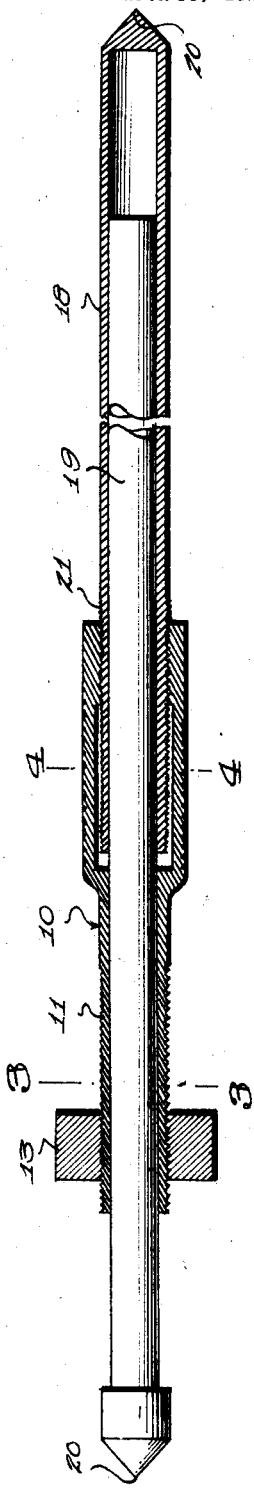
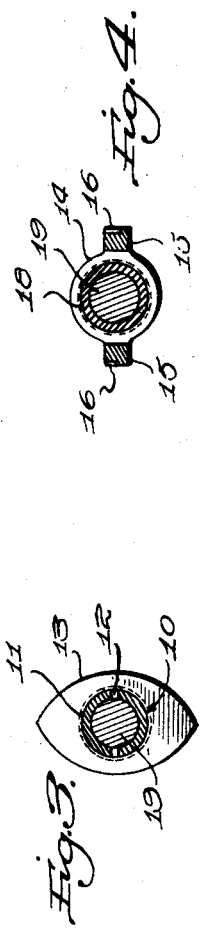
Inventor
EMERSON JENKINS
Attorney Patented May 1, 1928.

UNITED STATES PATENT OFFICE.

EMERSON JENKINS, OF DANVILLE, ILLINOIS.

WHEEL-ALIGNING DEVICE.

Application filed March 30, 1927. Serial No. 179,636.

This invention relates to wheel aligning devices particularly adapted for aligning the front wheels of motor vehicles.

An important object of the invention is to provide a simple and easily operated aligning tool whereby the front wheels of motor vehicles properly may be aligned.

A further object is to provide a device of the above mentioned character which is relatively cheap to manufacture and which is adapted to permit an operator to quickly determine and indicate the proper "toe-in" to be given to the front wheels of the vehicle.

A further object is to provide means whereby a rough adjustment may be obtained and to provide further means whereby accurate measurements may be indicated upon a suitably calibrated portion of the device.

A further object is to provide a device of the above mentioned character having a body portion which supports a pair of measuring devices, one of the devices being slidable to secure a rough adjustment and the other device being threaded in the body portion to permit finer adjustments.

Other objects and advantages of the invention will become apparent during the course of the following description.

In the drawings I have shown one embodiment of the invention. In this showing:—

Figure 1 is a perspective view of the tool,

Figure 2 is a central longitudinal sectional view, parts being shown in elevation, Figure 3 is a transverse section on line 3—3 of Figure 2, and, Figure 4 is a similar view on line 4—4 of Figure 2.

Referring to the drawing the numeral 10 designates the body of the device which is substantially tubular and is threaded at one end as indicated at 11. The threaded end of the body is slotted as at 12 and a clamping member 13 is arranged on the threaded end of the body as clearly shown in Figures 1 and 2. The clamping member projects outwardly from the body on opposite sides thereof to permit ready manipulation by the operator, as will become apparent. The body further includes a sleeve 14 spaced from the main portion of the body and connected thereto by opposite parallel members 15 which may be suitably calibrated as at 16. For convenience in handling, the portion of the body between the threads 11 and the parallel members 15 may be knurled, as indicated at 17.

A pair of telescoping members 18 and 19 are carried by the body, as clearly shown in Figure 2, and each has a conical outer end as shown at 20. The inner end of the member 18 is externally threaded as at 21 to engage internal threads formed on the sleeve 14. The member 18 is tubular, as indicated, and slidably receives the inner end of the member 19, the latter member also being slidable in the body 10.

The operation of the device is as follows:

The threads 11 are sufficiently tapered to permit the clamping member to clamp the end of the threaded portion of the body when the clamping member is moved inwardly. When it is desired to operate the device the member 13 is revolved to move it to the outer end of the body and thus release the member 19. The device is then placed between the wheels of the vehicle whereupon the operator may slide the member 19 outwardly until the conical ends 20 engage the proper portions of the wheels. The clamping member 13 is then tightened to fix the member 19 against movement with respect to the body. When the device is so employed it is preferable that the inner end of the member 18 be spaced from the end of the body 10, and fine adjustments may be made by revolving the member 18. For instance, if it is desired to move the front portions of the wheels closer together, the device is placed between the rear portions of the wheels and the distance which these portions of the wheels are moved outwardly accurately may be measured by the calibrations 16 by comparing the positions of the inner end of member 18 with relation to the calibrations 16 both before and after the rear portions of the wheels are moved outwardly. Conversely, accurate adjustment of the wheels can be obtained when it is desired to move the rear portions of the wheels closer together. It will be obvious that the rough adjustment provided by the member 19 and the clamping means associated therewith permits the device to be readily and quickly used while the threaded mounting of the member 18 permits fine adjustments to be readily obtained.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A device of the character described comprising a body including an elongated tubular portion having diametrically opposite slots extending a substantial distance from its end, the tubular portion of said body being externally threaded, a pair of measuring members telescoped one within the other carried by said body and arranged in alignment with each other, one of said members being threaded in said body, the other of said members being slidable longitudinally within the tubular portion of said body, and a nut arranged on the threaded portion of said body and adapted to clamp the slotted portion thereof against said last named member to fix the latter against longitudinal movement with respect to said body.

2. A device of the character described comprising a body including an elongated tubular portion having diametrically opposite slots projecting a substantial distance from the end thereof, the slotted portion of said body being externally threaded, said body further including a sleeve spaced from the opposite end of the tubular portion thereof and a pair of arms connecting the tubular portion of the body to said sleeve, a tubular measuring member threaded in said sleeve and having its end normally spaced from the adjacent end of the tubular portion of said body, a second measuring member slidable in the tubular portion of said body and in said first named measuring member, and a nut threaded on the tubular portion of said body and adapted to clamp the slotted portion of said body against said second named member to fix the latter against longitudinal movement with respect to said body.

3. A device constructed in accordance with claim 2 wherein one of said arms is calibrated, the calibrations being adapted to coact with the adjacent end of said first named member to determine the position thereof.

In testimony whereof I affix my signature.

EMERSON JENKINS.